United States Patent
Waters

(10) Patent No.: US 9,863,335 B1
(45) Date of Patent: Jan. 9, 2018

(54) METHOD FOR DIAGNOSING A VARIABLE-LIFT CAMSHAFT FOLLOWER

(71) Applicant: Delphi Technologies, Inc., Troy, MI (US)

(72) Inventor: James P. Waters, Waterford, MI (US)

(73) Assignee: DELPHI TECHNOLOGIES, INC., Troy, MI (US)

( * ) Notice: Subject to any disclaimer, the term of this patent is extended or adjusted under 35 U.S.C. 154(b) by 0 days.

(21) Appl. No.: 15/235,633

(22) Filed: Aug. 12, 2016

(51) Int. Cl.
*F02D 35/02* (2006.01)
*F02D 41/22* (2006.01)
*F02P 5/152* (2006.01)
*F01L 13/00* (2006.01)
*F02P 5/15* (2006.01)

(52) U.S. Cl.
CPC ........ *F02D 35/027* (2013.01); *F01L 13/0031* (2013.01); *F02D 41/221* (2013.01); *F02P 5/152* (2013.01)

(58) Field of Classification Search
CPC ........ F02D 35/02; F02D 35/027; F02D 41/22; F02D 41/221; F02D 41/226; F01L 13/0031; F01L 13/0223; F02P 5/122; F02P 5/1526

See application file for complete search history.

(56) References Cited

U.S. PATENT DOCUMENTS

| | | | |
|---|---|---|---|
| 4,770,143 A * | 9/1988 | Takahashi | F02P 5/1526 123/406.16 |
| 6,769,402 B2 * | 8/2004 | Franke | F02D 41/266 123/406.16 |
| 6,776,026 B1 | 8/2004 | Barron | |
| 7,024,304 B2 * | 4/2006 | Fukasawa | F02D 35/027 701/111 |
| 7,047,924 B1 | 5/2006 | Waters et al. | |
| 7,063,057 B1 | 6/2006 | Waters et al. | |
| 7,387,018 B2 | 6/2008 | Wiles | |
| 7,444,236 B2 | 10/2008 | Wiles | |
| 7,484,498 B2 * | 2/2009 | Hitomi | F02D 13/0223 123/316 |
| 7,761,217 B2 | 7/2010 | Waters et al. | |
| 8,245,692 B2 * | 8/2012 | Glugla | F02D 35/027 123/406.29 |
| 2009/0048729 A1 | 2/2009 | Waters et al. | |
| 2009/0078225 A1 | 3/2009 | Hendriksma | |
| 2014/0058650 A1 | 2/2014 | Betz et al. | |

* cited by examiner

*Primary Examiner* — Hieu T Vo
(74) *Attorney, Agent, or Firm* — Joshua M. Haines

(57) ABSTRACT

A method for diagnosing a variable-lift camshaft follower of an internal combustion includes detecting a first knock using a spark knock sensor of the internal combustion engine; retarding ignition timing of the internal combustion engine after detecting the first knock such that the ignition timing is retarded sufficiently to ensure that spark knock is no longer possible; detecting a second knock using the spark knock sensor after retarding the ignition timing sufficiently to ensure that spark knock is no longer possible; determining that the variable-lift camshaft follower is not functioning as desired based on the second knock; and activating a malfunction alert based on the determining that the variable-lift camshaft follower is not functioning as desired.

15 Claims, 5 Drawing Sheets

METHOD FOR DIAGNOSING A VARIABLE-LIFT CAMSHAFT FOLLOWER

TECHNICAL FIELD OF INVENTION

The present invention relates to a method for diagnosing a variable-lift camshaft follower; more particularly to such a method which uses a spark knock sensor for diagnosing the variable-lift camshaft follower.

BACKGROUND OF INVENTION

Internal combustion engines with increased fuel economy and decreased harmful emissions, for example as used in automotive vehicles, are the subject of much research and development. One area of research in internal combustion engines is focused on the valve train which is responsible for opening and closing air intake valves which allow air into combustion chambers of the internal combustion engine and which is also responsible for opening and closing exhaust valves which allow combustion products out of the combustion chambers. Throughout the remainder of this section, the intake valves and exhaust valves will be generically referred to as combustion valves. As is known in the art of internal combustion engines, one or more camshafts are used to open and close the combustion valves. The camshaft includes one or more lobes which are eccentric to the axis of rotation of the camshaft. A camshaft follower interfaces directly with a camshaft lobe and translates the rotating motion of the camshaft into opening and closing motion of the combustion valve in a cyclic manner during operation of the internal combustion engine.

In order to allow for flexibility under different torque requirement conditions during operation of the internal combustion engine, variable-lift camshaft followers have been developed which are switchable between a high-lift mode which opens the combustion valve by a first magnitude and a low-lift mode which opens the combustion valve by a second magnitude that is less than said first magnitude. In this way, the quantity of air allowed into the combustion chamber is varied depending on the operating conditions of the internal combustion engine. For example, when the internal combustion engine is operating in a low-torque condition, the low-lift mode can be selected in order to maximize fuel efficiency while achieving the torque demands of the internal combustion engine. Conversely, when the internal combustion engine is operating in a high-torque condition, the high-lift mode can be selected in order to maximize torque output of the internal combustion engine.

With the introduction of variable-lift camshaft followers to internal combustion engines, it is also necessary to diagnose the variable-lift camshaft followers in order to ensure that they are operating as desired. This is necessary to comply with OBD II diagnostic requirements as well as to avoid damage to other components of the internal combustion engine when a variable-lift camshaft follower is not operating as desired.

One existing diagnostic strategy for diagnosing variable-lift camshaft followers includes engine airflow-based algorithms. However, this approach may suffer from a signal to noise ratio issue that does not permit adequate diagnostic of the variable-lift camshaft followers at all times or over all operating conditions.

Another existing diagnostic approach for diagnosing variable-lift camshaft followers includes the addition of proximity sensors that directly measure the lift movement of each variable-lift camshaft follower. However, this approach requires additional hardware which results in additional cost and complexity. Furthermore, the associated hardware, wiring, and software associated with the proximity sensors must also be diagnosed for OBD II compliance.

U.S. Pat. No. 7,024,304 to Fukasawa et al. and United States Patent Application Publication No. US 2009/0048729 to Waters et al. describe strategies which utilize a spark knock sensor in the diagnostic approach for diagnosing the variable-lift camshaft followers. However, these diagnostic approaches use the spark knock sensor to indirectly diagnose the variable-lift camshaft followers. More specifically, Fukasawa et al. uses actual spark knock detected by the spark knock sensor to diagnose the variable-lift camshaft followers and Waters et al. uses the spark knock sensor to detect the closing of the combustion valves in order to diagnose the variable-lift camshaft followers.

What is needed is method for diagnosing a variable-lift camshaft follower which minimizes or eliminates one or more the shortcomings as set forth above.

SUMMARY OF THE INVENTION

Briefly described, a method for diagnosing a variable-lift camshaft follower is provided. The variable-lift camshaft follower transmits opening and closing motion from a camshaft of an internal combustion engine to a combustion valve of the internal combustion engine where the variable-lift camshaft follower is switchable between a high-lift mode which opens the combustion valve by a first magnitude and a low-lift mode which opens the combustion valve by a second magnitude that is less than the first magnitude. The method includes detecting a first knock using a spark knock sensor of the internal combustion engine; retarding ignition timing of the internal combustion engine after detecting the first knock such that the ignition timing is retarded sufficiently to ensure that spark knock is no longer possible; detecting a second knock using the spark knock sensor after retarding the ignition timing sufficiently to ensure that spark knock is no longer possible; determining that the variable-lift camshaft follower is not functioning as desired based on the second knock; and activating a malfunction alert based on the determining that the variable-lift camshaft follower is not functioning as desired.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

This invention will be further described with reference to the accompanying drawings in which.

DETAILED DESCRIPTION OF INVENTION

Figure 1:
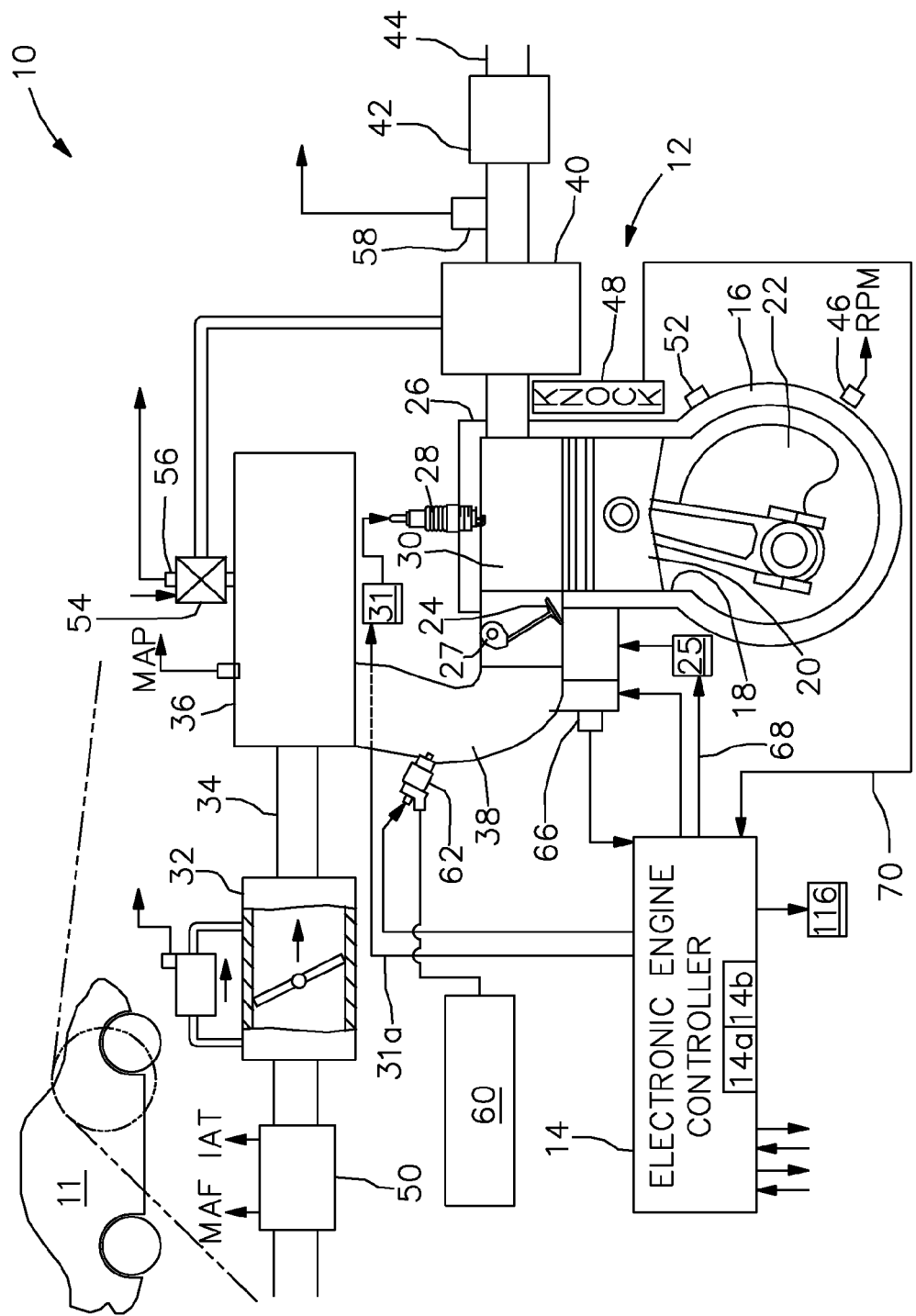
FIG. 1 is a schematic diagram of a system that may be used to implement the method of the present invention, showing an engine control module and an internal combustion engine including a variable-lift camshaft follower.

Referring now to the drawings, wherein the figures are for the purpose of illustrating an embodiment of the invention only, FIG. 1 shows an internal combustion engine system 10 in an automotive vehicle 11. The internal combustion engine system 10 includes an internal combustion engine 12 controlled by an electronic engine controller 14, all in accordance with the present invention.

Internal combustion engine 12 may be a spark-ignition engine that includes a number of base engine components, sensing devices, output systems and devices, and a control system. While the description of the present invention will take the form of a diagnostic method embedded in electronic engine controller 14 of automotive vehicle 11, it should be understood that other embodiments, such as, for example, stand-alone devices of the type used in a dealer service center, may be alternatively configured in accordance with the present invention as well.

With continued reference to FIG. 1, electronic engine controller 14 is configured via suitable programming to contain various software algorithms and calibrations, electrically connected and responsive to a plurality of engine and vehicle sensors, and operably connected to a plurality of output devices. Electronic engine controller 14 includes at least one microprocessor, associated memory devices such as read only memory (ROM) 14a and random access memory (RAM) 14b, input devices for monitoring input from external analog and digital devices, and output drivers for controlling output devices. In general, electronic engine controller 14 is operable to monitor engine operating conditions and operator inputs using the plurality of sensors, and control engine operations with the plurality of output systems and actuators, using pre-established algorithms and calibrations that integrate information from monitored conditions and inputs. The software algorithms and calibrations which are executed in electronic engine controller 14 and which are not within the scope of the present invention may generally comprise conventional strategies known to those of ordinary skill in the art. These programmed algorithms and calibrations are configured, when executed, to monitor the operating conditions of internal combustion engine 12 and operator demands using the plurality of sensors, and control the plurality of engine actuators accordingly. The software algorithms and calibrations are preferably embodied in pre-programmed data stored for use by electronic engine controller 14.

Figure 2:
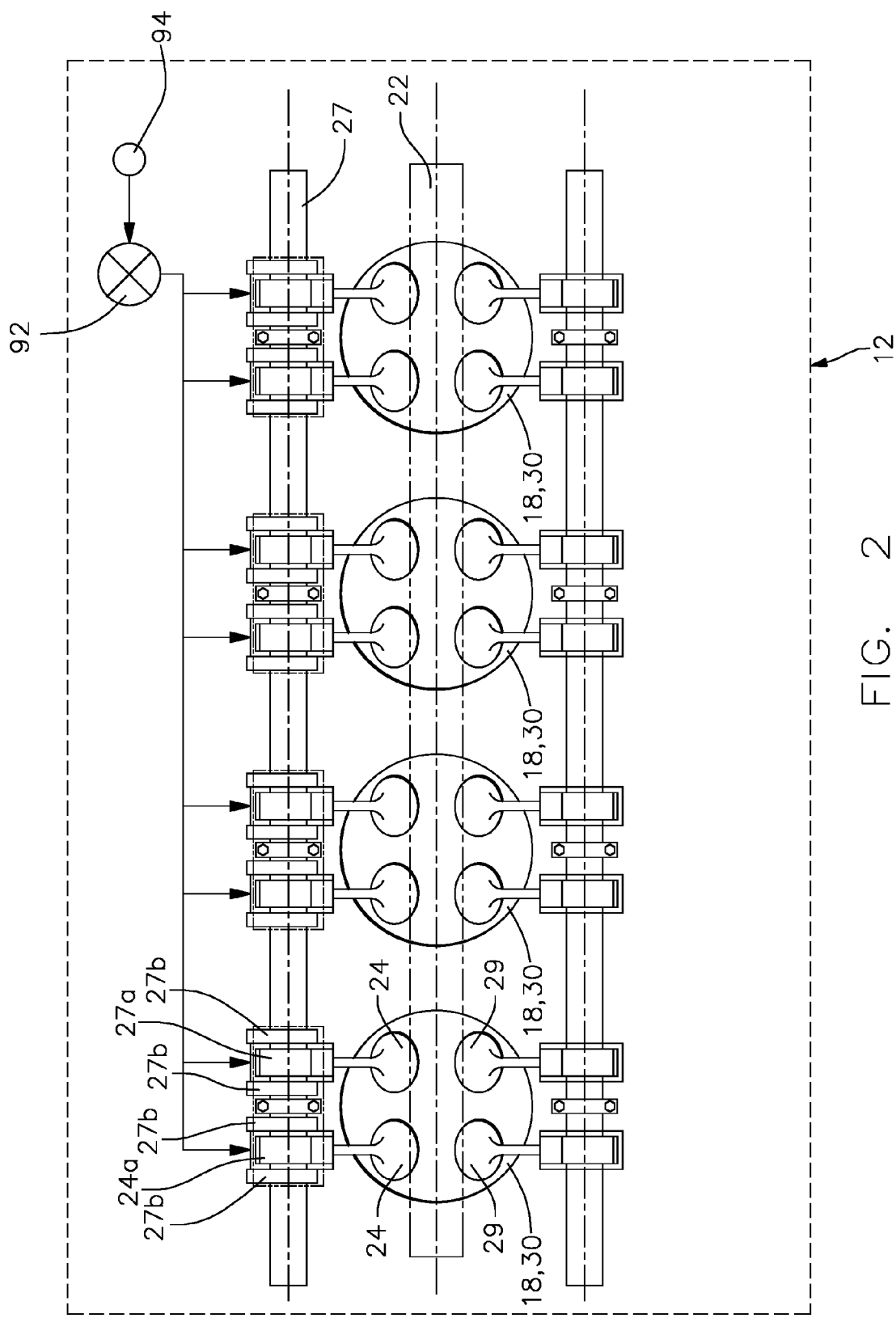
FIG. 2 is a another schematic diagram of a portion of the system of FIG. 1.

With continued reference to FIG. 1, and now with additional reference to FIG. 2, the base engine components of internal combustion engine 12 include an engine block 16 with a plurality of cylinders 18, one of which is shown in FIG. 1. Each cylinder 18 contains a respective piston 20 operably attached to a crankshaft 22 at a point eccentric to an axis of rotation of crankshaft 22. There is a cylinder head 26 at the top of each piston 20 containing one or more air intake valves 24, one or more variable-lift camshaft followers 25 such that each variable-lift camshaft follower 25 is operably coupled to one or more respective air intake valves 24 and translates opening and closing motion from a camshaft 27 to the respective air intake valves 24, one or more exhaust valves 29, a spark plug 28, and an ignition coil 31. A combustion chamber 30 is formed within cylinder 18 between piston 20 and the cylinder head 26. It should be noted that FIG. 2, for simplicity, has not referenced like components in each cylinder 18/combustion chamber 30. An intake manifold is fluidly connected to cylinder head 26, substantially adjacent to air intake valves 24. The intake manifold is connected to an air control valve 32, and includes a common air inlet 34 into a plenum 36, which flows into a plurality of parallel intake runners 38. The plurality of parallel intake runners 38 is preferably formed to permit flow of substantially equal volumes of air from the air control valve 32 to each of the plurality of cylinders 18. An exhaust manifold 40 is fluidly connected to cylinder head 26, substantially adjacent to exhaust valves 29, and facilitates flow of exhaust gases away from the engine to exhaust system components 42, 44.

Variable-lift camshaft follower 25 is controlled in accordance with a control signal 68 generated by electronic engine controller 14 pursuant to various pre-programmed strategies to switch between a high-lift mode and a low-lift mode. The high-lift mode of variable-lift camshaft follower 25 allows air intake valve 24 to open to a first magnitude while the low-lift mode allows air intake valve 24 to open to a second magnitude which is less than the first magnitude as is known in the art. As defined and used herein, the magnitude of opening of combustion valves includes one or both of the distance the combustion valve moves away from its respective valve seat and the duration the combustion valve is open. In this way, the quantity of air allowed into combustion chamber 30 can be varied depending on the operating conditions of internal combustion engine 12. For example, when internal combustion engine 12 is operating in a low-torque condition, electronic engine controller 14 can be used to place variable-lift camshaft follower 25 in the low-lift mode in order to maximize fuel efficiency while achieving the torque demands of internal combustion engine 12. Conversely, when internal combustion engine 12 is operating in a high-torque condition, electronic engine controller 14 can be used to place variable-lift camshaft follower 25 in the high-lift mode in order to maximize torque output of internal combustion engine 12.

FIG. 1 further shows a spark knock sensor 48 configured to generate a corresponding spark knock sensor output signal 70. As known to one of ordinary skill in the art, internal combustion engine 12 may already be pre-configured to include one or more spark knock sensors 48 as part of its spark ignition control system. As known, in general, electronic engine controller 14 is configured to evaluate input from spark knock sensors 48 and make adjustments, if necessary, to its control strategy to minimize or eliminate the occurrence of spark knock, for example, by adjusting of the timing in which spark plug 28 is operated to produce an ignition-generating spark in combustion chamber 30. As will be understood to those of ordinary skill in the art, ignition timing is adjusted using ignition coil 31 which produces spark generating voltage which is communicated to spark plug 28 as a result of an ignition signal 31a from electronic engine controller 14. Spark knock sensor 48 may comprise conventional components and construction known to those of ordinary skill in the art. One example of such a spark knock sensor is described in U.S. Pat. No. 6,776,026 to Barron, the disclosure of which is incorporated herein by reference in its entirety.

Internal combustion engine system 10 includes a variety of other sensors. The plurality of sensing devices of the exemplary internal combustion engine 12 are operable to measure ambient conditions, various engine conditions and performance parameters, and operator inputs. Typical sensors include a crankshaft position sensor 46, a camshaft position sensor 66, a manifold absolute pressure (MAP)

sensor, a throttle position sensor (not shown), a mass air flow sensor 50, an intake air temperature (IAT) sensor (shown as an element of the mass air flow sensor 50), a coolant temperature sensor 52, an exhaust gas recirculation (EGR) valve 54 with an EGR position sensor 56, and one or more oxygen sensors or other exhaust gas sensors 58.

The plurality of output systems and devices of the exemplary internal combustion engine 12 are operable to control various elements of internal combustion engine 12, and include an air intake system, a fuel injection system, an ignition system, EGR valve 54 and related system, a purge control system (not shown) and exhaust system components 42, 44. The air intake system is operable to deliver filtered air to the combustion chamber 30 when the intake valve(s) 24 are open. The air intake system preferably includes an air filtering system fluidly connected to air control valve 32, which is fluidly connected to the intake manifold.

FIG. 1 also shows a fuel source 60, which feeds a fuel injector 62 configured to deliver fuel to corresponding combustion chamber 30 of internal combustion engine 12, one of which is shown in FIG. 1. Fuel injector 62 may be placed in a corresponding intake runner 38 at an end of the runner adjacent to the cylinder head 26, substantially near the intake valve(s) 24 to the cylinder 18. Consequently, it should be understood that a respective fuel injector 62 may be provided for each combustion chamber 30. In an alternative arrangement, fuel injector 62 may inject fuel directly into combustion chamber 30 rather than into intake runner 38. Conventionally, fuel may be liquid fuel, but may alternatively comprise propane fuel, natural gas fuel (compressed natural gas-CNG), or other fuel types now known or hereafter developed. Design of an air intake system, including all of the aforementioned components, is known to one of ordinary skill in the art. The exemplary liquid fuel delivery and injection system comprises fuel source 60 mentioned above with a fuel pump (not shown) that provides fuel to a fuel line and fuel rail (not shown) to deliver liquid fuel to each fuel injector 62. Each fuel injector 62 is fluidly connected and operable to deliver a quantity of fuel to one of the plurality of intake runners 38. Each fuel injector 62 is controlled according to a respective fuel injection signal generated by the electronic engine controller 14 and delivered via a respective electrical connection. Each fuel injection signal controls the open time of the associated fuel injector. Mechanization of an internal combustion engine, using sensors, output devices, and electronic engine controller 14 including development of algorithms and calibrations that are not within the scope of the present invention, is known to those of ordinary skill in the art.

Figure 3:
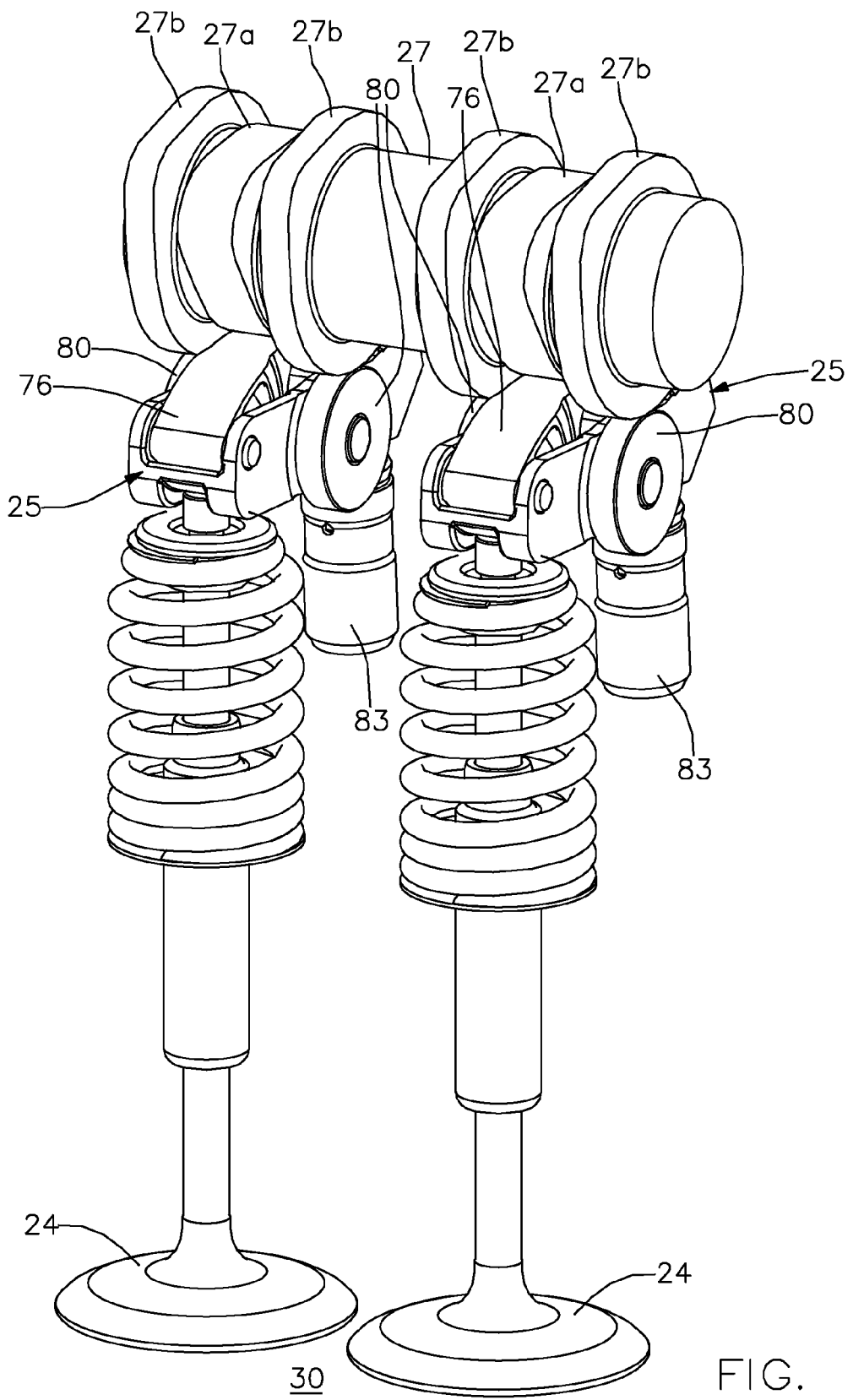
FIG. 3. is an isometric view of a pair of combustion valves and respective variable-lift camshaft followers of the internal combustion engine of FIG. 1.
Figure 4:
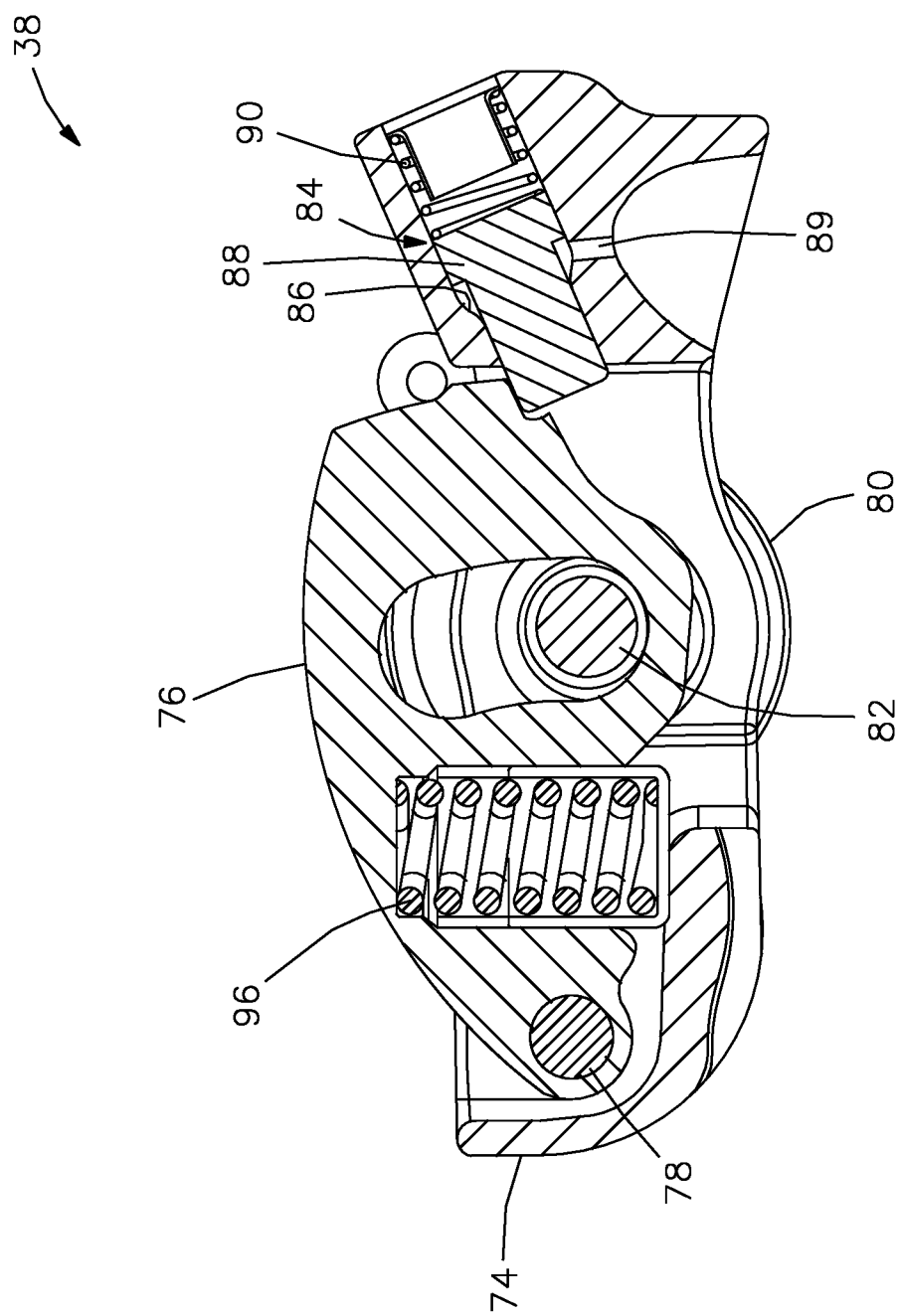
FIG. 4. is a cross-sectional view of one of the variable-lift camshaft followers of FIG. 3.

Now with reference to FIGS. 3 and 4, variable-lift camshaft follower 25 will be described by way of non-limiting example only. As shown in FIG. 3, two variable-lift camshaft followers 25 are illustrated where each variable-lift camshaft follower 25 is associated with a respective air intake valve 24 for a single combustion chamber 30. However, it should be understood that air intake valves 24 may alternatively be associated with distinct combustion chambers 30 that are adjacent to each other. It should also be understood that air intake valves 24 may alternatively represent exhaust valves which allow exhaust constituents out of combustion chamber 30. In this way, air intake valves 24 of FIG. 3 can be generically referred to as combustion valves which encompass both intake valves and exhaust valves of internal combustion engine 12.

Variable-lift camshaft follower 25 includes a follower body 74 within which is mounted a center high lift follower 76 which is selectively pivotable within follower body 74 about a pivot shaft 78. High lift follower 76 follows a high lift intake lobe 27a of camshaft 27 in a sliding interface. A pair of low lift followers 80, illustrated as rollers which flank high lift follower 76, are mounted to follower body 74 on a roller shaft 82. Each low lift follower 80 follows a respective low lift intake lobe 27b of camshaft 27 in a rolling interface. A first end of follower body 74 engages and pivots about a lash adjuster 83 while a second end engages air intake valve 24, thereby causing air intake valve 24 to open and close as variable-lift camshaft follower 25 pivots about lash adjuster 83 as a result of rotation of camshaft 27. While high lift follower 76 has been illustrated as a sliding interface, it should now be understood that high lift follower 76 may alternatively be a roller. Similarly, while low lift followers 80 have been illustrated as rollers, it should now be understood that low lift followers 80 may alternatively be sliding interfaces.

A latching mechanism 84 is disposed within follower body 74 at the end thereof which engages lash adjuster 83. Latching mechanism 84 includes a latch bore 86 in follower body 74 within which a latch pin 88 is slidably disposed. Latch pin 88 selectively engages high lift follower 76, thereby preventing relative movement between high lift follower 76 and follower body 74. Latch pin 88 also selectively disengages high lift follower 76, thereby allowing high lift follower 76 to pivot relative to follower body 74 about pivot shaft 78. A latch spring 90 urges latch pin 88 into engagement with high lift follower 76 when high lift of air intake valve 24 is desired. Conversely, pressurized oil is supplied to latch pin 88 through an oil passage 89, thereby compressing latch spring 90 and disengaging latch pin 88 from high lift follower 76 when low lift of air intake valve 24 is desired. The supply of pressurized oil to latch pin 88 may be controlled, for example, by an oil control valve 92 which receives oil from an oil supply 94 of internal combustion engine 12.

A lost motion spring 96, illustrated for example only as a compression coil spring, is disposed operatively between high lift follower 76 and follower body 74. When latch pin 88 is disengaged from high lift follower 76, lost motion spring 96 is compressed and uncompressed in a cyclic pattern by high lift intake lobe 27a. In this way, lost motion spring 96 maintains contact between high lift follower 76 and high lift intake lobe 27a while not permitting valve lifting motion to be transferred from high lift intake lobe 27a to air intake valve 24.

Further features and characteristics of variable-lift camshaft follower 25 are shown in United States Patent Application Publication No. 2009/0078225 to Hendriksma and U.S. Pat. No. 7,761,217 to Waters et al., the entire disclosures of which are incorporated herein by reference in their entirety.

Diagnostics are desired and/or required to have varying levels of detection and reporting capability with respect to variable-lift camshaft follower 25. For example only, the so-called on board diagnostics II (OBD II) regulations, "Comprehensive Components" requirements, and the like specify particular diagnostic capabilities to ensure that key operating features and components of the vehicle are not malfunctioning. Consequently, the present invention avers to provide such diagnostic capabilities of variable-lift camshaft follower 25. More specifically, the Inventor has discovered that spark knock sensor 48 can be used to determine that variable-lift camshaft follower 25 is not functioning as desired. While the prior art shows spark knock sensors being used to diagnose variable valve train devices, it is important to note that the prior art shows spark knock sensors being used to indirectly diagnose the variable valve train devices. For example, the prior art shows that spark knock sensors can be used to detect when a combustion valve has seated with its valve seat which is then compared against the expected time of closing of the combustion valve. In another example, the spark knock sensor is used to sense actual spark knock which results from the variable valve train device not functioning as desired. In contrast, the Inventor has discovered that a variable-lift camshaft follower that is not functioning as desired can be detected directly by the spark knock sensor and can further be used to identify which cylinder/combustion chamber the identified variable-lift camshaft follower is associated with and can also provide some detail as to the type of malfunction that may have occurred. An embodiment of such a method of diagnosing a variable-lift camshaft follower is provided in the paragraphs that follow.

Figure 5:
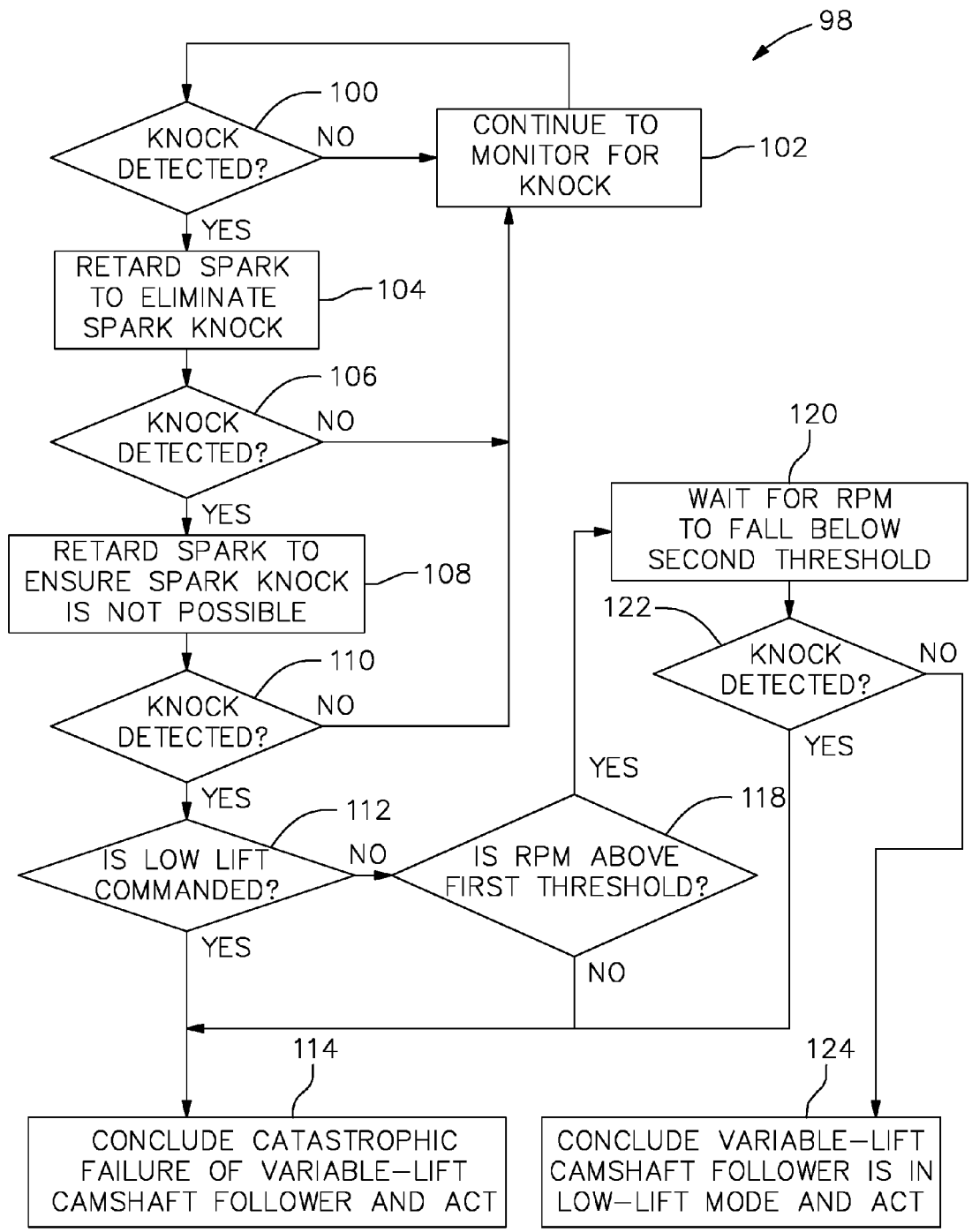
FIG. 5 is a flow chart showing a method of diagnosing the variable-lift camshaft follower.

With additional reference to FIG. 5, a method 98 of diagnosing a variable-lift camshaft follower will now be described. In a step 100, spark knock sensor 48 is used to monitor for knock. If no knock is detected, no change in operation of internal combustion engine 12 is necessary based upon spark knock sensor 48 as indicated by the "no" branch of step 100 which results in a step 102 being performed where knock is continued to be monitored by spark knock sensor 48. Conversely, if step 100 results in knock being detected as indicated by the "yes" branch of step 100, spark timing is retarded in a step 104. Knock being detected at step 100 can be seen as a first knock, however, the term "first" is not intended to be limited to a single event, but rather may be a periodic occurrence. More specifically with regard to step 104, spark timing is retarded by a predetermined amount, using electronic engine controller 14 and ignition coil 31 to cause spark plug 28 to generate a spark later in the combustion cycle compared to the previous timing, as would be necessary to eliminate spark knock resulting from spark plug 28 generating a spark too early. It will be recognized to those of ordinary skill in the art that the predetermined amount will depend upon the design of the internal combustion engine that is being used, however, those of ordinary skill in the art will readily know the magnitude of spark retard that is needed to eliminate spark knock without retarding the spark too far so as to sacrifice power and fuel economy. In one example of a typical four cylinder internal combustion engine, retarding the spark timing 3° (in terms of crankshaft degrees of rotation) may be used to eliminate spark knock. After the spark is retarded in step 104, a step 106 is performed in order to determine if knock still exists. If knock no longer exists as indicated by the "no" branch of step 106, no change in operation of internal combustion engine 12 is necessary based upon spark knock sensor 48 which results in step 102 being performed where knock is continued to be monitored by spark knock sensor 48. Conversely, if step 106 results in knock being detected as indicated by the "yes" branch of step 106, spark timing is retarded further in a step 108. Knock being detected at step 100 can be seen as a second knock, however, is not intended to be limited to a single event, but rather may be a periodic occurrence and furthermore may be a persistence of the first knock. More specifically with regard to step 106, spark is retarded by an amount sufficient to ensure that spark knock is no longer possible, using electronic engine controller 14 and ignition coil 31. The magnitude of spark retard that is sufficient to ensure that spark knock is no longer possible is again dependent upon the design of the internal combustion engine that is being used, however, those of ordinary skill in the art will readily know the magnitude of spark retard that is needed to ensure that spark knock is no longer possible. In one example of a typical four cylinder internal combustion engine, retarding the spark timing 10° may be used to ensure that spark knock is no longer possible. After the spark timing is retarded in step 108, a step 110 is performed in order to determine if knock still exists. If knock no longer exists as indicated by the "no" branch of step 110, no change in operation of internal combustion engine 12 is necessary based upon spark knock sensor 48 which results in step 102 being performed where knock is continued to be monitored by spark knock sensor 48. Conversely, if step 110 results in knock being detected as indicated by the "yes" branch of step 110, a conclusion can be drawn that variable-lift camshaft follower 25 is not functioning as desired based on knock occurring at step 110. Knock being detected at step 110 can be seen as the second knock continuing despite the ignition timing being retarded sufficiently to ensure that spark knock is no longer possible.

After detecting knock at step 110, the method can provide additional detail about the nature of variable-lift camshaft follower 25 not functioning as desired. More specifically, in a step 112, the commanded state of variable-lift camshaft follower 25 is considered. If low-lift of variable-lift camshaft follower 25 is commanded by electronic engine controller 14, as indicated by the "yes" branch of step 112, a step 114 is performed where a conclusion is drawn that a catastrophic failure of variable-lift camshaft follower 25 has occurred and appropriate action takes place. As used herein, a catastrophic failure is a failure of variable-lift camshaft follower 25 where two or more components are no longer in their designed spatial relationship relative to each other, the connection between two or more components no longer functions as designed, one or more components has a deformed or severed, or unintended movement exists within a single component or between two or more components. Foremost, a malfunction alert 116 is triggered by electronic engine controller 14 when a conclusion has been drawn that a catastrophic failure of variable-lift camshaft follower 25 has occurred. Malfunction alert 116 may take several forms, by way of non-limiting example only, a visual alert to the operator of automotive vehicle 11, an audible alert to the operator of automotive vehicle 11, a change in the operational state of internal combustion engine 12, and combinations thereof. Further by way of non-limiting example, the rotational rate of internal combustion engine 12 may be limited to a predetermined magnitude in order to prevent damage to internal combustion engine 12 as a result of the catastrophic failure of variable-lift camshaft follower 25. Step 114 may also include indexing the timing of the knock detected at step 110 to the rotational position of crankshaft 22 and camshaft 27, thereby allowing identification of the specific cylinder 18/combustion chamber 30 with which the failed variable-lift camshaft follower 25 is associated by virtue of the cyclic nature of camshaft 27 interacting with variable-lift camshaft follower 25 to generate corresponding cyclic knock that is detected at step 110. The specific cylinder 18/combustion chamber 30 with which the failed variable-lift camshaft follower 25 is associated can be stored within electronic engine controller 14, thereby allowing a service technician to later interrogate the information to aid in repairing internal combustion engine 12.

Conversely, if the high-lift mode of variable-lift camshaft follower 25 is commanded by electronic engine controller 14, as indicated by the "no" branch of step 112, the rotational rate of internal combustion engine 12 is compared against a first threshold to determine if the rotational rate of internal combustion engine 12 is above the first threshold. The first threshold is the rotational rate of internal combustion engine 12 at which, while variable-lift camshaft follower 25 is in the low-lift mode, low lift followers 80 are guaranteed to separate from low lift intake lobes 27b once per revolution of camshaft 27. The magnitude of the first threshold is again dependent upon the design of the internal combustion engine that is being used, however, those of ordinary skill in the art will readily know the rotational rate of the internal combustion engine at which the low lift followers are guaranteed to separate from the low lift intake lobes while the variable-lift camshaft follower is in the low-lift mode. In one example of a typical four cylinder internal combustion engine, the first threshold may be 5,000 RPM. If a conclusion at step 118 is made that the rotational rate of internal combustion engine 12 is below the first threshold as indicated by the "no" branch of step 118, step 114 is performed in accordance with the previous description where a conclusion is drawn that a catastrophic failure of variable-lift camshaft follower 25 has occurred and the previously described actions are carried out. Conversely, if a conclusion at step 118 is made that the rotational rate of internal combustion engine 12 is equal to or above the first threshold as indicated by the "yes" branch of step 118, a step 120 is performed where a waiting period exists until internal combustion engine 12 falls below a second threshold which may be the same as the first threshold, but is preferably less than the first threshold for the purpose of hysteresis. Preferably, the second threshold is the rotational rate of internal combustion engine 12 at which, while variable-lift camshaft follower 25 is in the low-lift mode, low lift followers 80 are guaranteed to maintain contact with low lift intake lobes 27b for the entire revolution of camshaft 27. The magnitude of the second threshold is again dependent upon the design of the internal combustion engine that is being used, however, those of ordinary skill in the art will readily know the rotational rate of the internal combustion engine at which the low lift followers are guaranteed to maintain contact with the low lift intake lobes for the entire revolution of the camshaft while the variable-lift camshaft follower is in the low-lift mode. In one example of a typical four cylinder internal combustion engine, the second threshold may be 4,500 RPM. The waiting period of step 120 may include an intrusive command by electronic engine controller 14 to limit internal combustion engine 12 to be below the second threshold, or may alternatively include waiting for the operator of automotive vehicle 11 to command internal combustion engine 12 to be below the second threshold.

After step 120, a step 122 is performed in order to determine if knock still exists. If knock is still detected as indicated by the "yes" branch of step 122, step 114 is performed in accordance with the previous description where a conclusion is drawn that a catastrophic failure of variable-lift camshaft follower 25 has occurred, and the previously described actions are carried out. Conversely, if knock no longer exists as indicated by the "no" branch of step 122, i.e. the second knock has ceased, a step 124 is performed where a conclusion can be drawn that the knock detected in step 110 was the result of low lift followers 80 coming back into contact with low lift intake lobes 27b after low lift followers 80 had lost contact with low lift intake lobes 27b, i.e. separation has been experienced, due to internal combustion engine operating above the first threshold and therefore variable-lift camshaft follower 25 must be in the low-lift mode despite being commanded to be in the high-lift mode. In response, malfunction alert 116 is triggered by electronic engine controller 14 when a conclusion has been drawn that variable-lift camshaft follower 25 is operating in the low-lift mode despite being commanded to high-lift mode. As mentioned previously, malfunction alert 116 may take several forms, by way of non-limiting example only, a visual alert to the operator of automotive vehicle, an audible alert to the operator of automotive vehicle 11, a change in the operational state of internal combustion engine 12, and combinations thereof. Further by way of non-limiting example, the rotational rate of internal combustion engine 12 may be limited to a predetermined magnitude in order to prevent damage to internal combustion engine 12 or variable-lift camshaft follower 25 as a result of variable-lift camshaft follower 25 being in the low-lift mode despite being commanded to the high-lift mode. Step 124 may also include indexing the timing of the knock detected at step 110 to the rotational position of crankshaft 22 and camshaft 27, thereby allowing identification of the specific cylinder 18/combustion chamber 30 with which variable-lift camshaft follower 25 that is not functioning as desired is associated by virtue of the cyclic nature of camshaft 27 interacting with variable-lift camshaft follower 25 to generate corresponding cyclic knock that is detected at step 110. As mentioned previously, the specific cylinder 18/combustion chamber 30 with which the failed variable-lift camshaft follower 25 is associated can be stored within electronic engine controller 14, thereby allowing a service technician to later interrogate the information to aid in repairing internal combustion engine 12.

In summary, method 98 provides diagnostics of variable-lift camshaft follower 25 using existing hardware. Furthermore, method 98 allows for distinctions to be made between variable-lift camshaft follower 25 suffering from a catastrophic failure and variable-lift camshaft follower 25 operating in the low-lift mode despite being commanded to high-lift mode.

While variable-lift camshaft follower 25 has been embodied herein with respect to air intake valves 24, it should now be readily apparent that variable-lift camshaft follower 25 may alternatively be useful in actuation of exhaust valves 29. As such, and as mentioned previously, air intake valves 24 and exhaust valves 29 may be generically referred to as combustion valves within the scope of the present invention.

While this invention has been described in terms of preferred embodiments thereof, it is not intended to be so limited, but rather only to the extent set forth in the claims that follow.

I claim:

1. A method for diagnosing a variable-lift camshaft follower which transmits opening and closing motion from a camshaft of an internal combustion engine to a combustion valve of said internal combustion engine, said variable-lift camshaft follower being switchable between a high-lift mode which opens said combustion valve by a first magnitude and a low-lift mode which opens said combustion valve by a second magnitude that is less than said first magnitude, said method comprising:
   detecting a first knock using a spark knock sensor of said internal combustion engine;
   retarding ignition timing of said internal combustion engine after detecting said first knock such that said ignition timing is retarded sufficiently to ensure that spark knock is no longer possible;
   detecting a second knock using said spark knock sensor after retarding said ignition timing sufficiently to ensure that spark knock is no longer possible;
   determining that said variable-lift camshaft follower is not functioning as desired based on said second knock; and activating a malfunction alert based on said determining that said variable-lift camshaft follower is not functioning as desired.

2. A method as in claim 1 further comprising limiting the rotational rate of said internal combustion engine based on said determining that said variable-lift camshaft follower is not functioning as desired.

3. A method as in claim 1 wherein said internal combustion engine comprises a plurality of combustion chambers and a crankshaft and wherein said variable-lift camshaft follower is one of a plurality of variable-lift camshaft followers such that each one of said plurality of variable-lift camshaft followers is associated with a respective one of said plurality of combustion chambers, said method further comprising:
   indexing said second knock to the rotational position of said crankshaft; and
   determining which one of said plurality of combustion chambers is associated with said variable-lift camshaft follower that is not functioning as desired based on said indexing of said second knock to the rotational position of said crankshaft.

4. A method as in claim 3 further comprising reporting which one of said plurality of combustion chambers is associated with said variable-lift camshaft follower that is not functioning as desired.

5. A method as in claim 1 further comprising:
   determining that the rotational rate of said internal combustion engine is above a first threshold when said second knock is detected;
   waiting for the rotational rate of said internal combustion engine to fall below a second threshold that is less than said first threshold;
   determining that said second knock has ceased after the rotational rate of said internal combustion engine falls below said second threshold; and
   determining that said variable-lift camshaft follower is in said low-lift mode when said variable-lift camshaft follower has been commanded to be in said high-lift mode based on said second knock ceasing after the rotational rate of said internal combustion engine falls below said second threshold.

6. A method as in claim 5 wherein said waiting for the rotational rate of said internal combustion engine to fall below the second threshold includes limiting the rotational rate of said internal combustion engine to be below said second threshold.

7. A method as in claim 5 wherein said internal combustion engine comprises a plurality of combustion chambers and a crankshaft and wherein said variable-lift camshaft follower is one of a plurality of variable-lift camshaft followers such that each one of said plurality of variable-lift camshaft followers is associated with a respective one of said plurality of combustion chambers, said method further comprising:
   indexing said second knock to the rotational position of said crankshaft; and
   determining which one of said plurality of combustion chambers is associated with said variable-lift camshaft follower that is not functioning as desired based on said indexing of said second knock to the rotational position of said crankshaft.

8. A method as in claim 7 further comprising reporting which one of said plurality of combustion chambers is associated with said variable-lift camshaft follower that is not functioning as desired.

9. A method as in claim 5 wherein said first threshold is greater than said second threshold.

10. A method as in claim 1 further comprising:
   determining that the rotational rate of said internal combustion engine is above a first threshold when said second knock is detected;
   waiting for the rotational rate of said internal combustion engine to fall below a second threshold that is less than said first threshold;
   determining that said second knock has continued after the rotational rate of said internal combustion engine falls below said second threshold; and
   determining that a catastrophic failure of said variable-lift camshaft follower has occurred based on said second knock continuing after the rotational rate of said internal combustion engine falls below said second threshold.

11. A method as in claim 10 further comprising limiting the rotational rate of said internal combustion engine based on said determining that said catastrophic failure of said variable-lift camshaft follower has occurred.

12. A method as in claim 1 further comprising:
   determining, when said second knock is determined, that the rotational rate of said internal combustion engine is below a threshold when said variable-lift camshaft follower has been commanded to be in said high-lift mode; and
   determining that a catastrophic failure of said variable-lift camshaft follower has occurred based on determining that the rotational rate of said internal combustion engine is below said threshold when said variable-lift camshaft follower has been commanded to be in said high-lift mode.

13. A method as in claim 12 further comprising limiting the rotational rate of said internal combustion engine based on said determining that said catastrophic failure of said variable-lift camshaft follower has occurred.

14. A method as in claim 1 further comprising determining that a catastrophic failure of said variable-lift camshaft follower has occurred based on said second knock and said variable-lift camshaft follower being commanded to said low-lift mode.

15. A method as in claim 14 further comprising limiting the rotational rate of said internal combustion engine based on said determining that said catastrophic failure of said variable-lift camshaft follower has occurred.

* * * * *